United States Patent
Ha et al.

(10) Patent No.: US 9,922,444 B2
(45) Date of Patent: Mar. 20, 2018

(54) IMAGE PROCESSING APPARATUS AND METHOD

(71) Applicants: SAMSUNG ELECTRONICS CO., LTD., Suwon-si (KR); AARHUS UNIVERSITET, Aarhus C. (DK)

(72) Inventors: Inwoo Ha, Seongnam-si (KR); Minsu Ahn, Seoul (KR); Hyong Euk Lee, Suwon-si (KR); Jacob Toft Pedersen, Aarhus N. (DK); Hachisuka Toshiya, Aarhus N. (DK)

(73) Assignees: Samsung Electronics Co., Ltd., Suwon-si (KR); Aarhus Universitet, Aarhus C (DK)

(*) Notice: Subject to any disclaimer, the term of this patent is extended or adjusted under 35 U.S.C. 154(b) by 5 days.

(21) Appl. No.: 14/979,162

(22) Filed: Dec. 22, 2015

(65) Prior Publication Data

US 2016/0189418 A1    Jun. 30, 2016

(30) Foreign Application Priority Data

Dec. 23, 2014  (KR) .................. 10-2014-0187323

(51) Int. Cl.
  *G06T 15/06*  (2011.01)
  *G06T 15/00*  (2011.01)
  *G06T 15/50*  (2011.01)

(52) U.S. Cl.
  CPC .................... *G06T 15/06* (2013.01)

(58) Field of Classification Search
  None
  See application file for complete search history.

(56) References Cited

U.S. PATENT DOCUMENTS

| | | |
|---|---|---|
| 2006/0066616 A1 | 3/2006 | Sevastianov et al. |
| 2008/0049017 A1* | 2/2008 | Shearer .................. G06T 15/06 345/421 |
| 2008/0143720 A1* | 6/2008 | Elmquist ................ G06T 15/50 345/426 |
| 2009/0254293 A1 | 10/2009 | Tartaglia et al. |
| 2010/0079452 A1 | 4/2010 | Zhou et al. |
| 2011/0285710 A1 | 11/2011 | Mejdrich et al. |

(Continued)

FOREIGN PATENT DOCUMENTS

| | | |
|---|---|---|
| JP | 2014-89773 A | 5/2014 |
| KR | 10-2009-0125545 A | 12/2009 |
| KR | 10-1030352 B1 | 4/2011 |

OTHER PUBLICATIONS

Chen, Lieu-Hen, Tsung-Chih Tsai, and Yu-Sheng Chen. "Grouped photon mapping." The Visual Computer 26.3 (2010): 226. 217-226.*

*Primary Examiner* — Yi Wang
(74) *Attorney, Agent, or Firm* — NSIP Law (57) ABSTRACT

An image processing apparatus includes a memory configured to store a data structure in which gather rays generated by performing gather ray tracing from a rendering viewpoint are clustered hierarchically, the gather rays including a first gather ray and a second gather ray associated with the first gather ray in the data structure, and a processor configured to merge a photon gathering result associated with the second gather ray with a photon gathering result associated with the first gather ray in response to the photon gathering result associated with the first gather ray not satisfying a first condition.

12 Claims, 8 Drawing Sheets

(56) References Cited

U.S. PATENT DOCUMENTS

2013/0204902 A1\* 8/2013 Wang ................ G06F 17/30371
707/797
2014/0333624 A1\* 11/2014 Ha .......................... G06T 15/06
345/426

\* cited by examiner

IMAGE PROCESSING APPARATUS AND METHOD

CROSS-REFERENCE TO RELATED APPLICATION(S)

This application claims the benefit under 35 USC 119(a) of Korean Patent Application No. 10-2014-0187323 filed on Dec. 23, 2014, in the Korean Intellectual Property Office, the entire disclosure of which is incorporated herein by reference for all purposes.

BACKGROUND

1. Field

The following description relates to an image rendering field of photon mapping.

2. Description of Related Art

Photon mapping is used as a photorealistic high-definition rendering method. Photon mapping enables various effects such as specular, diffuse, caustics, and indirect illumination. However, photon mapping requires a high computational complexity for ray tracing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus includes a memory configured to store a data structure in which gather rays generated by performing gather ray tracing from a rendering viewpoint are clustered hierarchically, the gather rays including a first gather ray and a second gather ray associated with the first gather ray in the data structure; and a processor configured to merge a photon gathering result associated with the second gather ray with a photon gathering result associated with the first gather ray in response to the photon gathering result associated with the first gather ray not satisfying a first condition.

The data structure may be built by clustering the gather rays based on a similarity between characteristic information corresponding to the gather rays, and setting a hierarchical connection relationship of the clustered gather rays.

The characteristic information may include any one or any combination of any two or more of a three-dimensional (3D) position of an object point corresponding to each of the gather rays, a normal direction of the object point, a texture corresponding to the object point, and a bidirectional reflectance distribution function (BRDF) corresponding to the object point.

The second gather ray may be a neighbor gather ray of the first gather ray in the data structure that enables the first condition to be satisfied by the merging.

The first condition may be a condition in which a difference between the photon gathering result associated with the first gather ray and a photon gathering result associated with a neighbor gather ray of the first gather ray in the data structure is less than or equal to a first threshold.

The processor may be further configured to rebuild the data structure so that a second condition is satisfied in response to the photon gathering result associated with the first gather ray not satisfying the second condition.

The second condition may be a condition in which the difference between the photon gathering result associated with the first gather ray and the photon gathering result associated with the neighbor gather ray of the first gather ray in the data structure is less than or equal to a second threshold that is greater than the first threshold.

In another general aspect, an image processing apparatus includes a memory configured to store a data structure built by clustering gather rays generated by performing gather ray tracing from a rendering viewpoint based on a similarity between characteristic information corresponding to the gather rays and setting a hierarchical connection relationship of the clustered gather rays, the gather rays including a first gather ray, the data structure including parent nodes in an upper hierarchy of the first gather ray in the data structure; and a processor configured to determine a representative node of the first gather ray that enables a first condition to be satisfied among the parent nodes in response to a photon gathering result associated with the first gather ray not satisfying the first condition.

The data structure may further include leaf nodes corresponding to the gather rays; and the representative node may be a parent node of a leaf node corresponding to the first gather ray and a leaf node corresponding to a second gather ray among the gather rays that enables the first condition to be satisfied by sharing photon gathering between the first gather ray and the second gather ray.

The first condition may be a condition in which a difference between the photon gathering result associated with the first gather ray and a photon gathering result associated with a neighbor gather ray of the first gather ray in the data structure is less than or equal to a first threshold.

The processor may be further configured to rebuild the data structure so that a second condition is satisfied in response to the photon gathering result associated with the first gather ray not satisfying the second condition.

The second condition may be a condition in which the difference between the photon gathering result associated with the first gather ray and the photon gathering result associated with the neighbor gather ray of the first gather ray in the data structure is less than or equal to a second threshold that is greater than the first threshold.

In another general aspect, an image processing method of an image processing apparatus including computing hardware includes building a data structure in which gather rays generated by performing gather ray tracing from a rendering viewpoint are clustered hierarchically, the gather rays including a first gather ray and a second gather ray that is a neighbor gather ray of the first gather ray in the data structure; and associating the second gather ray with the first gather ray in response to a photon gathering result associated with the first gather ray not satisfying a first condition.

The data structure may include leaf nodes corresponding to the gather rays, and parent nodes in an upper hierarchy of the first gather ray in the data structure; and the associating may include determining a representative node that enables the first condition to be satisfied among the parent nodes, the representative node being a parent node of a leaf node corresponding to the first gather ray and a leaf node corresponding to a second gather ray among the gather rays; and sharing photon gathering between the first gather ray and the second gather ray.

The first condition may be a condition in which a difference between the photon gathering result associated with the first gather ray and a photon gathering result associated with a neighbor gather ray of the first gather ray in the data structure is less than or equal to a first threshold.

The method may further include rebuilding the data structure so that a second condition is satisfied in response to the photon gathering result associated with the first gather ray not satisfying the second condition.

The second condition may be a condition in which the difference between the photon gathering result associated with the first gather ray and the photon gathering result associated with the neighbor gather ray of the first gather ray in the data structure is less than or equal to a second threshold that is greater than the first threshold.

In another general aspect, a non-transitory computer-readable storage medium stores instructions to cause computing hardware to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparently to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terms used herein are mainly selected from general terms currently being used in light of the features described in this application. However, other terms may be used depending on development and/or changes in technology, custom, or a preference of an operator. Thus, it should be understood that the terms used herein are terms merely used to describe the examples, rather terms intended to limit the spirit and scope of this disclosure.

In addition, in a specific case, most appropriate terms have been arbitrarily selected by the inventors for ease of description and/or for ease of understanding. In this instance, the meanings of the arbitrarily used terms will be clearly explained in the corresponding description. Hence, the terms should be understood not by the simple names of the terms, but by the meanings of the terms and the following overall description of this specification.

Figure 1:
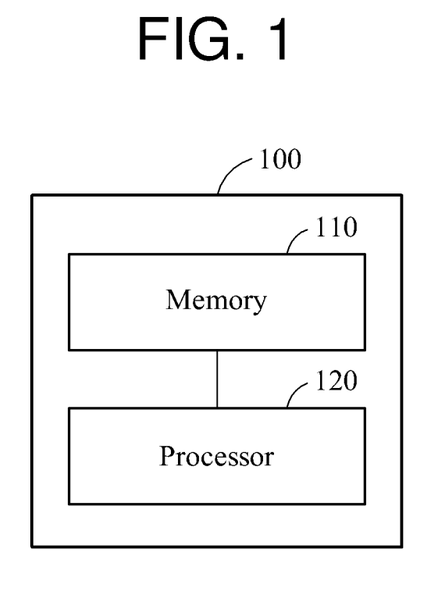
FIG. 1 is a block diagram illustrating an example of an image processing apparatus.

FIG. 1 is a block diagram illustrating an example of an image processing apparatus.

Referring to FIG. 1, an image processing apparatus 100 includes a memory 110 and a processor 120. To perform photon mapping, gather ray tracing is performed and measurement points are determined. The measurement points or gather rays are built into a hierarchical data structure. In one example, the data structure is a tree structure. In the data structure, the gather rays or the measurement points are clustered based on a similarity between their respective characteristic information, and are associated hierarchically. For example, the characteristic information may include any one or any combination of any two or more of a three-dimensional (3D) position of an object point corresponding to each gather ray, a normal direction of the object point, a texture corresponding to the object point, and a bidirectional reflectance distribution function (BRDF) corresponding to the object point. The data structure will be described in detail with reference to FIG. 4. The memory 110 at least temporarily stores the data structure and provides the data structure to the processor 120 and/or a renderer (not shown).

The processor 120 associates a first gather ray with a second gather ray in the data structure when a photon gathering result associated with the first gather ray does not satisfy a first condition. The foregoing process may be construed as a process of sharing photons between the first gather ray or a corresponding first measurement point and the second gather ray or a corresponding second measurement point. In detail, when the first gather ray is merged with the second gather ray, respective photon gathering results are shared therebetween. As will be described in more detail, the first condition is a condition that is satisfied when a difference between the photon gathering result associated with the first gather ray and a photon gathering result associated with a neighbor gather ray of the first gather ray in the data structure is less than or equal to a first threshold.

When the first condition is not satisfied, the data structure is rebuilt, rather than merging the gather rays. Such rebuilding is performed when the photon gathering result associated with the first gather ray does not satisfy a second condition. For example, but not limited thereto, the second condition is a condition that is satisfied when the difference between the photon gathering result associated with the first gather ray and the photon gathering result associated with the neighbor gather ray of the first gather ray in the data structure is less than or equal to a second threshold. In this example, the second threshold is greater than the first threshold. Examples will be described in detail with reference to FIG. 2 and the subsequent drawings.

Figure 2:
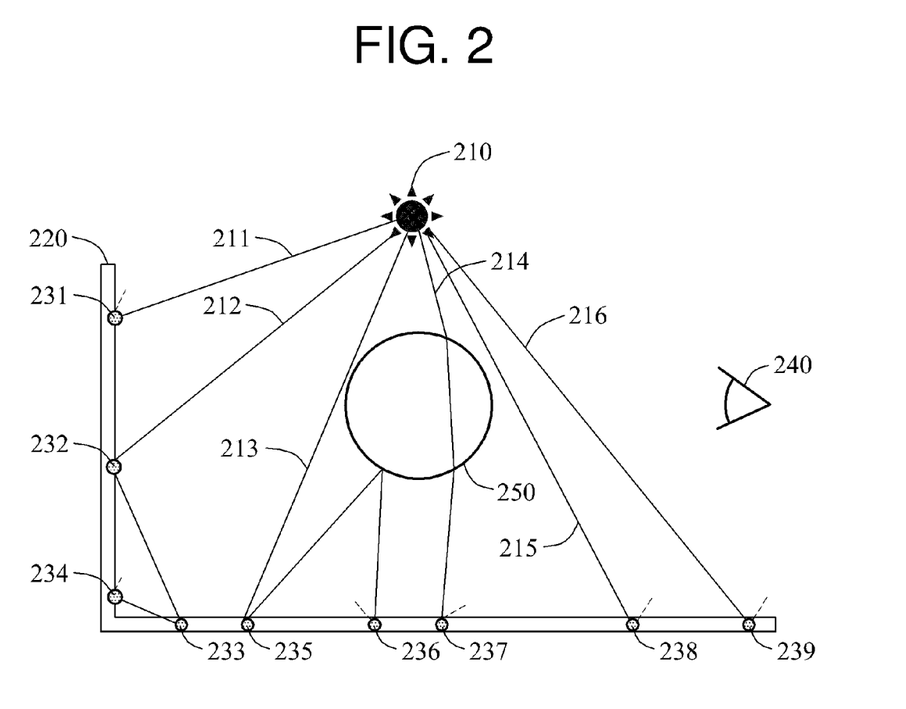
FIG. 2 is a diagram illustrating an example of a photon ray tracing process with respect to a three-dimensional (3D) model.

FIG. 2 is a diagram illustrating an example of a photon ray tracing process with respect to a 3D model. In general, photon mapping is a 2-pass algorithm. The first pass is a photon tracing process, and corresponds to a process of distributing photons departing from a light source 210 in a scene of a 3D space as illustrated in FIG. 2. Photons 231, 232, 233, 234, 235, 236, 237, 238, and 239 are distributed through various proceeding paths 211, 212, 213, 214, 215, and 216. Such a photon distribution or photon tracing process reflects the physical progress of light rays, for example, reflection as shown in the paths 212 and 213 along which light rays are reflected by an object 220, and refraction as shown in the path 214 along which a light ray is refracted by an object 250.

The second pass is referred to as gather ray tracing, and corresponds to a process of determining a measurement point at which a color value generated by a photon is to be measured through ray tracing from a viewpoint 240 at which an image is to be rendered. Determined measurement points correspond to portions to be used to calculate color values at object points. A color value at a viewpoint is determined by accumulating effects of color values of photons on the measurement points, whereby rendering by photon mapping is completed. In a case of progressive photon mapping (PPM) that is widely used, a measurement point is determined by performing ray tracing from the viewpoint 240. Photons around the measurement point are gathered and measured through photon tracing or photon distribution as illustrated. In the photon distribution process, when a rendering result is noisy, a process of sharing photons between measurement points is performed, rather than increasing a number of photons to be distributed. The foregoing process will be described in detail with reference to FIGS. 3 through 5B.

Figure 3:
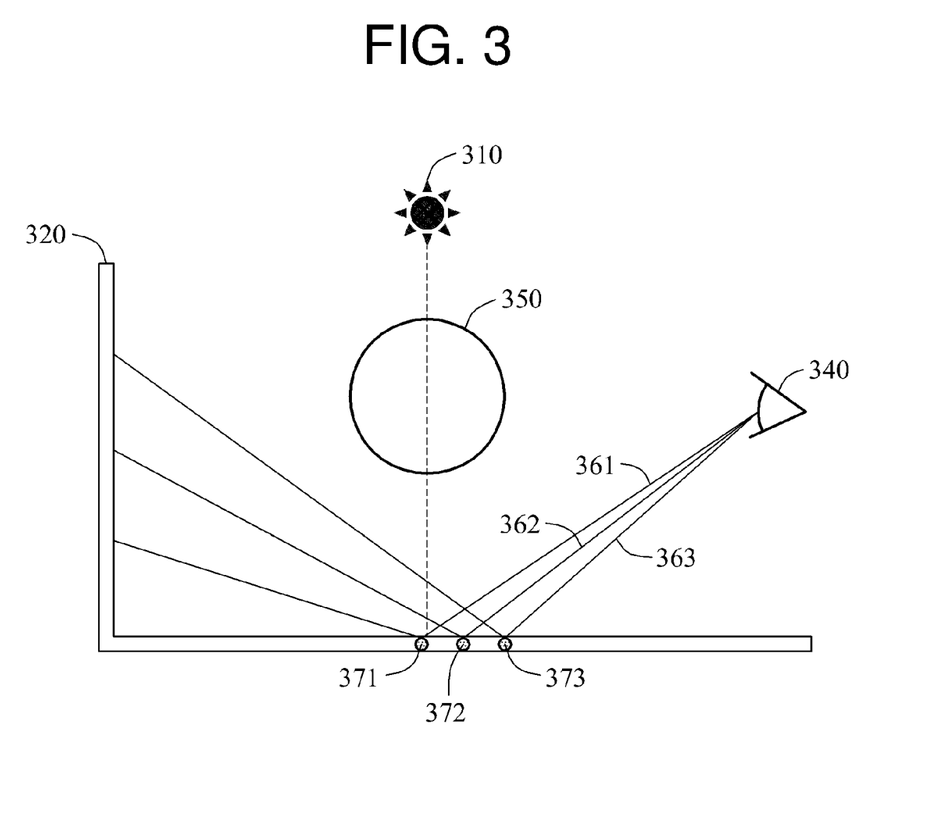
FIG. 3 is a diagram illustrating an example of a gather ray tracing process.

FIG. 3 is a diagram illustrating an example of a gather ray tracing process.

Referring to FIG. 3, by tracing rays 361, 362 and 363 departing from pixels of an image corresponding to a rendering viewpoint 340, measurement points 371, 372, and 373 at which the rays 361, 362 and 363 collide with an object 320 are determined. In a rendering process, photons are gathered at each of the measurement points. In this example, gathering photons is construed as calculating and accumulating color values generated by photons identified as being distributed from a light source 310 and reaching a measurement point, for example, the measurement point 371. With respect to the measurement point 371, effects of color values generated by photons departing from the light source 310, passing through an object 350, and reaching the measurement point 371, and effects of color values generated by photons reflected or refracted through other proceeding paths (not shown) and reaching the measurement point 371 are calculated and accumulated.

The gather rays 361, 362, and 363 and/or the measurement points 371, 372, and 373 associated therewith are built and managed as a hierarchical data structure. In existing typical photon mapping, when an image acquired as a result of gathering photons at measurement points is noisy, a number of photons to be distributed is increased. However, such a process of increasing photon distribution is performed without considering a characteristic of a scene or a measurement point. Thus, in some cases, redundant distributing of photons causes an increase in a computational complexity. In one example, in lieu of and/or in addition to increasing the number of photons to be distributed, a portion of measurement points are associated to share photons therebetween. Measurement points between which photons are to be shared are preset as a hierarchical data structure, which will be described with reference to FIG. 4.

Figure 4:
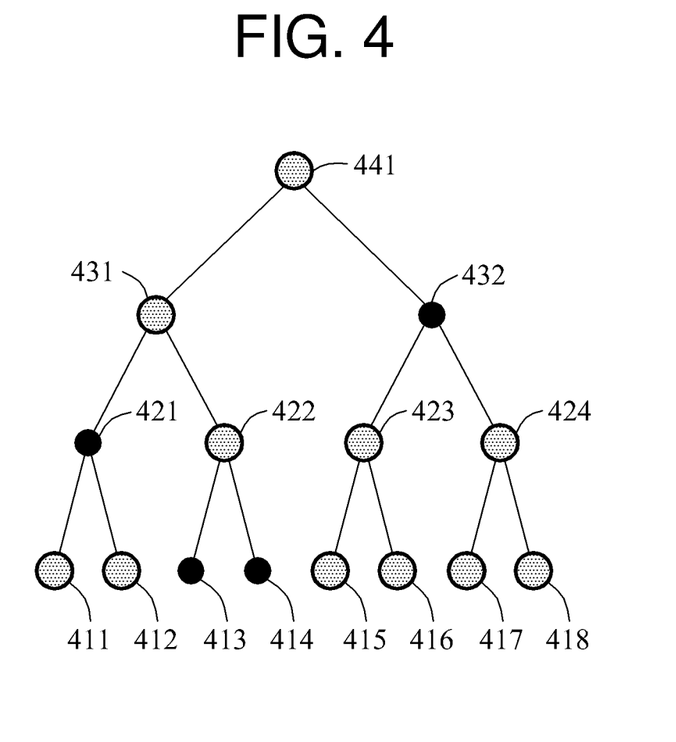
FIG. 4 is a diagram illustrating an example of a data structure.

FIG. 4 is a diagram illustrating an example of a data structure.

Referring to FIG. 4, a data structure is built in a rendering process, temporarily or continuously stored in a memory, and used for photon mapping. For example, but not limited thereto, leaf nodes 411, 412, 413, 414, 415, 416, 417, and 418 correspond to gather rays identified in a gather ray tracing process and/or measurement points of the gather rays. Since a measurement point may be identified and specified with respect to a single gather ray, a leaf node may be considered to correspond to either a gather ray or a measurement point. Thus, although examples may be described based on a premise that a leaf node corresponds to one of a gather ray and a measurement point, examples that the leaf node corresponds to the other one of the gather ray and the measurement point are not excluded.

The leaf nodes 411, 412, 413, 414, 415, 416, 417, and 418 corresponding to gather rays or measurement points are clustered based on characteristic information of the measurement points and/or the gather rays. Clustering may be construed as associating leaf nodes with the same parent node. In the data structure of FIG. 4, each leaf node is associated with a parent node 421, 422, 423, or 424 based on a similarity of characteristic information, and each parent node is associated with a grandparent node 431 or 432. Each grandparent node is associated with a root node 441.

For example, but not limited thereto, the characteristic information includes any one or any combination of any two or more of 3D positions, normal directions, textures, and BRDFs of measurement points. When measurement points are disposed at different 3D positions despite corresponding gather rays being adjacent to each other, the adjacent gather rays may correspond to different objects, and thus photon sharing therebetween may be inappropriate. By such a data structure, a relationship for photon sharing may be identified.

In one example, a data structure as shown may be built through gather ray tracing, and an error metric may be performed on a result of performing photon distribution and photon gathering. For example, color values are generated as a photon gathering result, and color values of neighbor leaf nodes, for example, the leaf nodes 411 and 412, are compared. The leaf nodes correspond to points that are adjacent to each other and have similar textures and BRDFs. Thus, a slight difference in color values between the leaf nodes after photon mapping is performed may be expected. Thus, when a condition that the difference in color values the leaf nodes is less than or equal to a first threshold, hereinafter referred to as a first condition, is not satisfied, a corresponding result is construed as being noisy due to insufficient photons being distributed to the leaf nodes. In this example, an image processing apparatus determines the parent node 421 of the leaf nodes 411 and 412 to be a representative node, without separately distinguishing the leaf nodes 411 and 412. All photons distributed to the leaf nodes 411 and 412 belonging to the parent node 421 are associated with gather rays associated with the leaf nodes 411 and 412. Color values are shared between the gather rays. When the first condition is not satisfied even when the parent node 421 is determined to be the representative node, the grandparent node 431 is determined to be the representative node by re-performing a hierarchical search. The grandparent node 432 is determined to be a representative node of the leaf nodes 415, 416, 417, and 418 in that manner. In some cases, when the first condition is satisfied at leaf nodes without performing such merging or photon sharing, the leaf nodes 413 and 414 are determined to be representative nodes autonomously.

However, in some other cases, the data structure may need to be rebuilt. For example, when a condition that a difference between color values of two leaf nodes is less than or equal to a second threshold, hereinafter referred to as a second condition, is not satisfied, the two leaf nodes are assumed not to be associated with the same parent node in a data structure. In this example, the second threshold is a value much greater than the first threshold. Measurement points or gather rays classified as being adjacent and similar to each other based on characteristic information may in fact correspond to different objects in reality or have different color values due to different directions, not because noise occurs due to insufficient photons being distributed, but because a probability of measurement points having different color values is relatively high. In this example, the data structure needs to be rebuilt. Thus, the characteristic information is re-analyzed, and one leaf node is separated from its parent node and moved to another parent node. The foregoing error metric will be described with reference to FIGS. 5A and 5B.

Figure 5A:
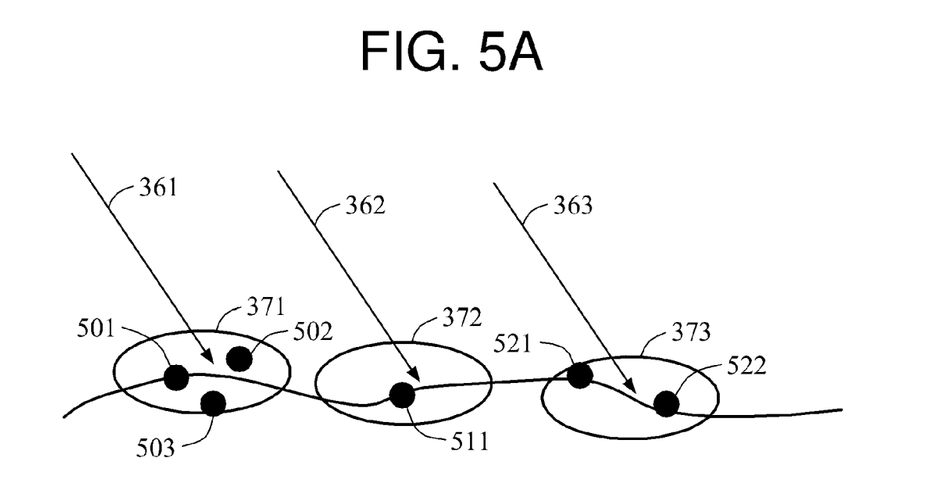
FIGS. 5A and 5B are diagrams illustrating an example of photon sharing between gather rays.
Figure 5B:
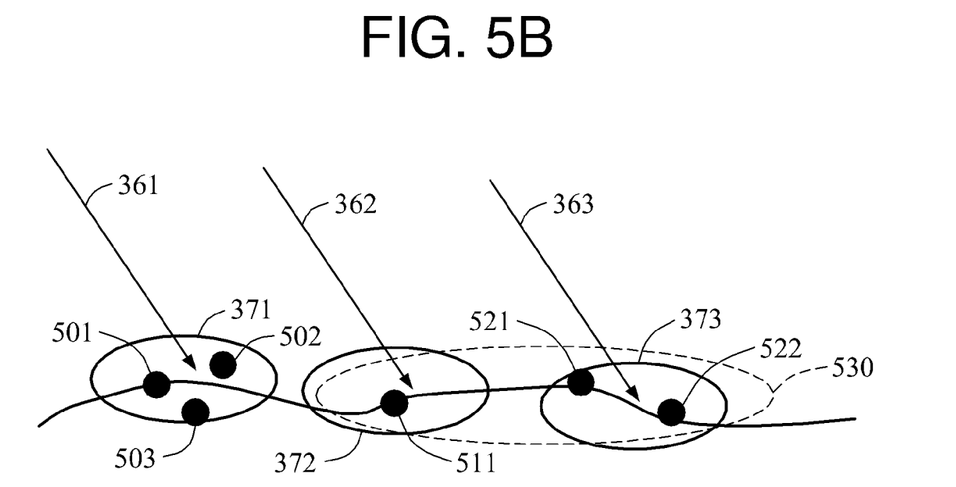

FIGS. 5A and 5B are diagrams illustrating an example of photon sharing between gather rays. In existing photon mapping, photons within the same radius from a measurement point are gathered and used, irrespective of a number of photons gathered at measurement points 371, 372, and 373. It is assumed that the number of photons 501, 502, and 503 at the measurement point 371 is sufficient. In one example, a super point 530 is determined by merging the measurement points 372 and 373 at which relatively fewer numbers of photons are gathered. From the aspect of a measurement point, the plurality of measurement points 372 and 373 are merged. Referring to FIG. 4 again, such merging is construed as generating the representative parent node 421 of an upper hierarchy that represents the leaf nodes 411 and 412. In detail, the leaf nodes 411 and 412 respectively correspond to the measurement points 372 and 373, for example. In response to such a determination, an error metric by the first condition is performed. According to the foregoing example with respect to the error metric, when a difference between a color value generated by a photon 511 gathered at the measurement point 372 and a color value generated by photons 521 and 522 gathered at the measurement point 373 is greater than the first threshold, the measurement points 372 and 373 are merged. In a case of the measurement point 371, a sufficient number of photons are distributed, and thus a corresponding result will not be noisy and differences in color values between the measurement point 371 and adjacent points are less than or equal to the first threshold. In this example, the measurement point 371 is not merged with another measurement point. In detail, the measurement point 371 corresponds to the leaf node 413 of FIG. 4, for example.

An example of merging measurement points so that a number of photons distributed at each measurement point is greater than or equal to a predetermined number of photons, rather than so that a difference in color values obtained as a photon gathering result is less than or equal to the first threshold, is also possible. However, in some cases, a corresponding result may not be noisy despite there being a relatively fewer number of photons distributed at a measurement point. In this example, skipping such processing may be helpful to increase a quality of rendering. When a number of measurement points to be merged increases, for example, when a representative node is selected as a node of an upper hierarchy in the example of FIG. 4, noise in a rendering result may be improved, but an issue of a bias of color values may arise. Thus, a determination based on resulting color characteristics may be more accurate than a determination based on merging of points or gather rays so that a number of photons to be gathered at each measurement point is greater than or equal to a predetermined number of photons.

Figure 6:
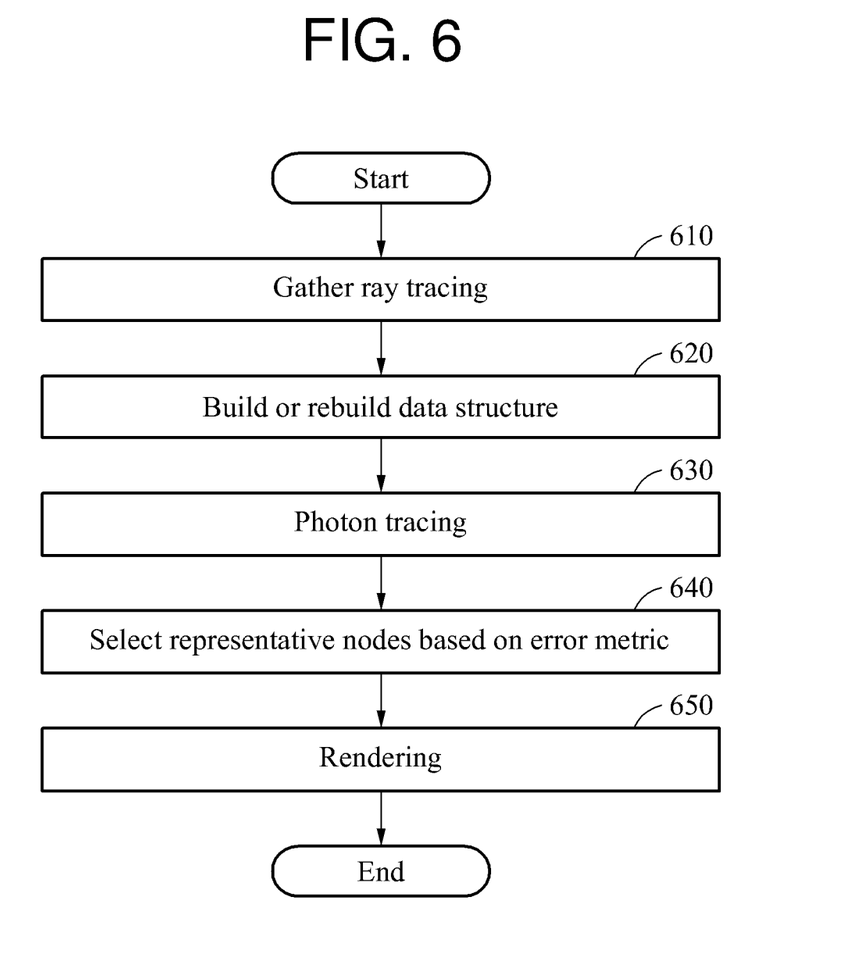
FIG. 6 is a flowchart illustrating an example of an image processing method.

FIG. 6 is a flowchart illustrating an example of an image processing method.

Referring to FIG. 6, in operation 610, gather ray tracing is performed to determine or search for measurement points. When measurement points are determined, a data structure is built or rebuilt with respect to the measurement points and/or gather rays in operation 620. The data structure is a hierarchical structure. For example, the data structure is a tree structure. A description of an example of the data structure was provided with reference to FIG. 4.

In operation 630, photon tracing is performed. In this example, photon distribution is performed and a color value generated by the distributed photons is determined. A first iteration of operations 620 and 630 may not be a final rendering result. In operation 640, the error metric as described above is performed by comparing a color value at each gather ray and/or each measurement point to a color value at an adjacent gather ray and or measurement point. Through iterative performing of operations 620 and 630, optimal representative nodes, for example, the nodes indicated in black in the data structure of FIG. 4, are determined. For example, a representative node may be a leaf node, like the leaf nodes 413 and 414 in FIG. 4, or a parent node, like the parent node 421 in FIG. 4, or a grandparent node, like the grandparent node 432 in FIG. 4. Using the representative nodes, rendering is performed in operation 650. In some cases, tree rebuilding is performed when a difference in color values between neighboring measurement points is relatively great. The foregoing process will be described further with reference to FIG. 7.

Figure 7:
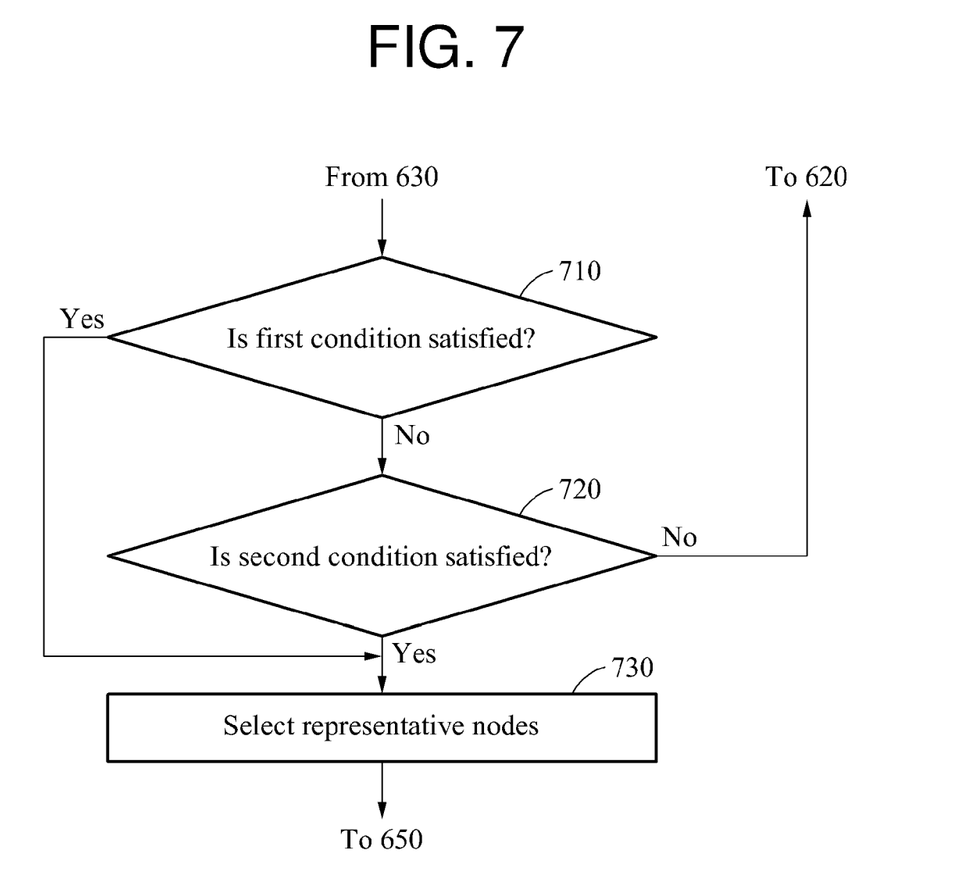
FIG. 7 is a flowchart illustrating an example of a process of selecting a representative node.

FIG. 7 is a flowchart illustrating an example of a process of selecting a representative node.

Referring to FIG. 7, in operation 710, whether a first condition is satisfied with respect to the measurement points is determined when a previous iteration is performed in operations 620 and 630. As described with reference to FIG. 4, the first condition is a condition that a difference in color values generated by photons gathered between neighboring nodes is less than or equal to a first threshold. When the first condition is not satisfied in operation 710, a corresponding result is determined to be noisy due to insufficient photons being distributed to leaf nodes. Thus, node merging or tree structure rebuilding is performed. Conversely, when the first condition is satisfied in operation 710, the nodes are determined not to be noisy, and photons distributed to the leaf nodes are used. In operation 730, the leaf nodes are selected as representative nodes.

When the first condition is not satisfied in operation 710, operation 720 is performed. In operation 720, whether a second condition is satisfied is determined. As described with reference to FIG. 4, the second condition corresponds to a process considering a case in which tree rebuilding is to be performed. When a condition that a difference in color values between neighboring nodes is less than or equal to a second threshold that is greater than the first threshold, that is, the second condition, is not satisfied, it is assumed that the neighboring nodes are not associated with the same parent node. In this example, operation 620 is re-performed to perform tree rebuilding. When the second condition is satisfied in operation 720, operation 730 is performed. In operation 730, the neighboring nodes are merged, and a parent node of the neighboring nodes is selected as a representative node.

As described above, distributed photons are adaptively shared between hierarchically associated measurement points and/or gather rays. Through the foregoing process, a quality of photon mapping is greatly improved without performing additional photon distribution and tracing. Further, such examples cause only a relatively slight increase in a computational complexity compared to an example of additionally distributing photons, and thus operation resources may be utilized efficiently.

The image processing apparatus 100, the memory 110, and the processor 120 illustrated in FIG. 1 that perform the operations described herein with respect to FIGS. 1-7 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIGS. 6 and 7 that performs the operations described herein with respect to FIGS. 1-7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising:
   a memory configured to store a data structure comprising leaf nodes and a hierarchy of parent nodes, in which gather rays generated by performing gather ray tracing from a rendering viewpoint are clustered hierarchically, the gather rays comprising a first gather ray and a second gather ray,
   wherein the first gather ray is associated with a first leaf node in the data structure, and
   wherein the second gather ray is associated with a second leaf node of the data structure and has a same parent node as the first leaf node; and
   a processor configured to
      compare a first property of the first leaf node with a second property of the second leaf node, determine a condition result indicating whether a difference between the first property and the second property is less than or equal to a first threshold, and determine a representative node based on the condition result,
  if the condition result indicates that the difference between the first property and the second property is not less than or equal to the first threshold, determine a second condition result indicating whether the difference between the first property and the second property is less than or equal to a second threshold that is greater than the first threshold, and
  if the second condition result indicates that the difference between the first property and the second property is not less than or equal to the second threshold, rebuild the data structure such that the second leaf node is moved to a different parent node from the first leaf node.

2. The apparatus of claim 1, wherein the data structure is built by clustering the gather rays based on a similarity between characteristic information corresponding to the gather rays, and setting a hierarchical connection relationship of the clustered gather rays.

3. The apparatus of claim 2, wherein the characteristic information comprises any one or any combination of any two or more of a three-dimensional (3D) position of an object point corresponding to each of the gather rays, a normal direction of the object point, a texture corresponding to the object point, and a bidirectional reflectance distribution function (BRDF) corresponding to the object point.

4. The apparatus of claim 1, wherein the processor is further configured to, upon determining that the second condition result indicates that the difference between the first property and the second property is less than or equal to the second threshold, determine the parent node of the first leaf node and the second leaf node as the representative node and merge the first leaf node and the second leaf node.

5. The apparatus of claim 1, wherein the processor is further configured to, upon determining that the condition result indicates that the difference between the first property and the second property is less than or equal to the first threshold, determine at least one of the first leaf node and the second leaf node as the representative node.

6. An image processing apparatus comprising:
  a memory configured to store a data structure comprising leaf nodes and a hierarchy of parent nodes, the data structure built by clustering gather rays generated by performing gather ray tracing from a rendering viewpoint based on a similarity between characteristic information corresponding to the gather rays and setting a hierarchical connection relationship of the clustered gather rays, the gather rays comprising a first gather ray and a second gather ray,
  wherein the first gather ray is associated with a first leaf node in the data structure, and
  wherein the second gather ray is associated with a second leaf node of the data structure and has a same parent node as the first leaf node; and
  a processor configured to verify the data structure, the verifying comprising
    determining a first condition result indicating whether a difference between a property of the first leaf node and a property of the second leaf node is less than or equal to a first threshold;
    if the condition result indicates that the difference between the property of the first leaf node and the property of the second leaf node is not less than or equal to the first threshold, determining a second condition result indicating whether the difference between the property of the first leaf node and the property of the second leaf node is less than or equal to a second threshold that is greater than the first threshold, and
    if the second condition result indicates that the difference between the property of the first leaf node and the property of the second leaf node is not less than or equal to the second threshold, rebuild the data structure such that the second leaf node is moved to a different parent node from the first leaf node.

7. The apparatus of claim 6, wherein the processor is further configured to:
  upon determining that the second condition result indicates that the difference between the property of the first leaf node and the property of the second leaf node is less than or equal to the second threshold, determine a presence of excess noise in at least one of the property of the first leaf node and the property of the second leaf node, and merge the first leaf node and the second leaf node; and
  upon determining that the second condition result indicates that the difference between the property of the first leaf node and the property of the second leaf node is not less than or equal to the second threshold, determine that the second gather ray has been improperly classified and rebuild the data structure such that the second leaf node is moved to the different parent node from the first leaf node.

8. An image processing method of an image processing apparatus comprising computing hardware, the method comprising:
  building a data structure comprising leaf nodes and a hierarchy of parent nodes, in which gather rays generated by performing gather ray tracing from a rendering viewpoint are clustered hierarchically, the gather rays comprising a first gather ray and a second gather ray,
  wherein the first gather ray is associated with a first leaf node in the data structure, and
  wherein the second gather ray is associated with a second leaf node of the data structure and has a same parent node as the first leaf node;
  comparing a first property of the first leaf node with a second property of the second leaf node;
  determining a condition result indicating whether a difference between the first property and the second property is less than or equal to a first threshold;
  determining a representative node based on the condition result,
  if the condition result indicates that the difference between the first property and the second property is not less than or equal to the first threshold, determining a second condition result indicating whether the difference between the first property and the second property is less than or equal to a second threshold that is greater than the first threshold, and
  if the second condition result indicates that the difference between the first property and the second property is not less than or equal to the second threshold, rebuilding the data structure such that the second leaf node is moved to a different parent node from the first leaf node.

9. A non-transitory computer-readable storage medium storing instructions to cause computing hardware to perform the method of claim 8.

10. The method of claim 8, further comprising:
upon determining that the condition result indicates that the difference between the first property and the second property is less than or equal to the first threshold, determining at least one of the first leaf node and the second leaf node as the representative node; and
upon determining that the condition result indicates that the difference between the first property and the second property is not less than or equal to the first threshold, determining the second condition result indicating whether the difference between the first property and the second property is less than or equal to the second threshold.

11. The method of claim 10, further comprising:
upon determining that the second condition result indicates that the difference between the first property and the second property is less than or equal to the second threshold, determining the parent node of the first leaf node and the second leaf node as the representative node and merging the first leaf node and the second leaf node; and
upon determining that the second condition result indicates that the difference between the first property and the second property is not less than or equal to the second threshold, rebuilding the data structure such that the second leaf node is moved to the different parent node from the first leaf node.

12. The method of claim 1, wherein the merging of the first leaf node and the second leaf node comprises sharing photons associated with the first gather ray and photons associated with the second gather ray.

* * * * *